C. SCHOCK.
FOOD CHOPPER.
APPLICATION FILED FEB. 26, 1915.
1,236,607.
Patented Aug. 14, 1917.
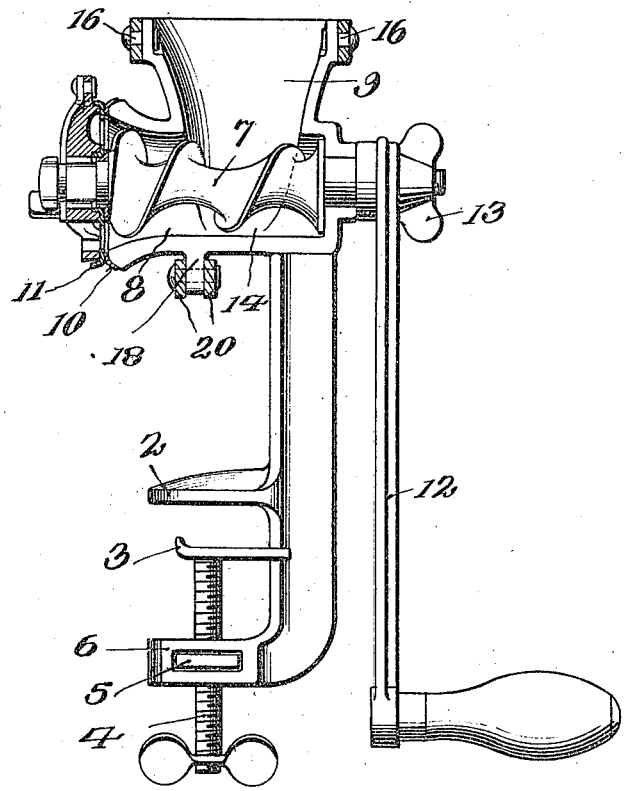
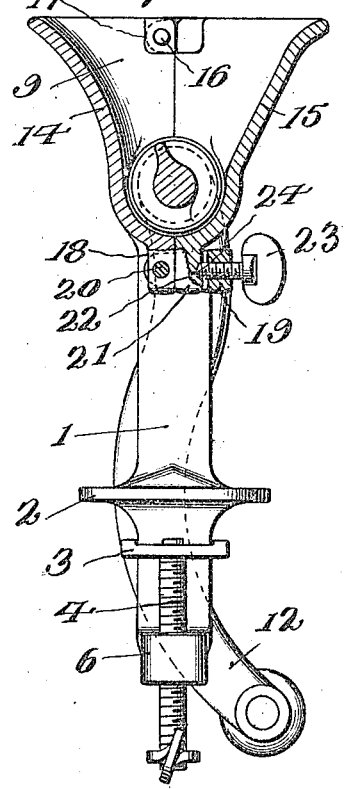
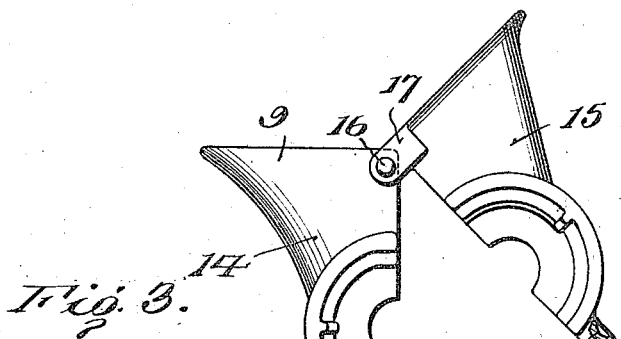
Witnesses
Inventor
Clarence Schock
By Alfred M. Houghton
his Attorney

UNITED STATES PATENT OFFICE.

CLARENCE SCHOCK, OF MOUNT JOY, PENNSYLVANIA.

FOOD-CHOPPER.

1,236,607. Specification of Letters Patent. Patented Aug. 14, 1917.

Application filed February 26, 1915. Serial No. 10,829.

*To all whom it may concern:*

Be it known that I, CLARENCE SCHOCK, residing at Mount Joy, in the county of Lancaster and State of Pennsylvania, have invented certain new and useful Improvements in Food-Choppers, of which the following is a specification.

This invention relates to food choppers, and comprises a food chopper having a barrel and hopper consisting of two complementary parts pivoted together at the top and carrying coöperating locking means at the bottom, whereby a tight non-leakable joint may be formed under the worm or forcer when the parts are locked together.

Food choppers to which my invention relate usually comprise a standard with fastening means for attachment to the edge of a table, a barrel and hopper therefor, a worm or other food forcer revolubly mounted in the barrel, a handle for turning the forcer and cutters associated with the forcer and barrel to continuously chop the food. It is usually a difficult matter to cleanse the hoppers and barrels. In an endeavor to overcome this difficulty it has been proposed to split the hoppers and barrels vertically and provide fastening means for securing the parts together. The parts of the hoppers and barrels have been hinged together at the bottom and a bail latch has been provided at the top, such bail latch being pivoted to one part of the hopper and arranged to embrace the other part to hold the two together. This type of split hopper food chopper is subject to the disadvantage that the juices from the food being chopped leak through the joint directly under the worm and because it is practically impossible to form a tight hinged joint, particles of the food during the chopping operation lodge in the loose joint, accumulate around the hinges, make the cleansing of the food chopper difficult and to some extent interfere with the operation of the worm. Locking mechanism arranged at the top of the hopper are in the way during the chopping operation and frequently in use are accidentally thrown out of locking position. The hinges which have been used at the bottom of the barrel parts must be made very strong because the barrel is subjected to tremendous strains during the chopping operation.

This invention is an improvement over the heretofore known split hopper type of culinary choppers in that it provides relatively strong latching and locking mechanism at the bottom in an accessible position but nevertheless out of the way during the chopping operation, and an inexpensive hinge member at the top for hinging the hopper sections together. The latch or latching and locking device is adjustable. In heretofore known vertically split food choppers the latches have not been adjustable and when the parts would wear because of frequent positioning of the latching member the parts could not be securely fastened together. The construction of my vertical split food chopper and latching member eliminates the possibility of great wear because of the use of the latching device and provides means for taking up any possible wear and also provides means for readily attaching the parts together.

Specifically, the hopper and barrel comprise two complementary parts hinged together at the top. One of these parts is provided with a lug and the other is provided with a pivoted U-shaped locking member having a screw. The lug of the one part and the U-shaped latching member of the other part are arranged for mutual engagement and the screw of said latching member may be operated to seat against one face of the lug and the parts may be drawn together through operation of this screw.

In the accompanying drawings showing one form of a specific embodiment of my invention, Fig. 1 is a vertical longitudinal section through the barrel of a food chopper, parts being shown in elevation;

Fig. 2 is a transverse section along line 2—2 of Fig. 1; and

Fig. 3 is a front elevation of the barrel showing the parts separated.

In the drawings 1 indicates the usual standard having upper clamping jaw 2 and lower adjustable clamping jaw 3 operating through the screw 4 which is threaded through nut 5 located in the outwardly turned horizontal portion 6 of the standard. The worm or forcer 7 may be of the usual type and the barrel 8 when the parts thereof are assembled may have the contour of the usual barrel in articles of this type. Hopper 9 serves for admission of food to the chopper. Cutters 10 and 11 associated with the forcer and barrel may be of the type described and claimed in my Patent No. 1,130,024. The handle 12 is keyed to one end of the worm and is retained in place by the winged nut 13.

The hopper and barrel are made in two parts. Section 14 is preferably integral with standard 1 while section 15 is pivoted to portion 14 by means of pivots 16 and ears or lugs 17 formed integral with part 15. Vertical depending lug 18 advantageously integral with section 14 is provided with a pivoted latch 19 secured in place by means of rivet 20. This latch is U-shaped and may be freely swung on the lug 18. Barrel portion 15 is provided with a depending lug 21 of a size to be embraced by the U-shaped latch 19. This lug 21 is preferably indented as at 22. The latch 19 is provided with a thumb screw 23 which has a somewhat pointed end 24 arranged to be seated in the indentation 22 in lug 21 on the opposite barrel portion. When the section 15 is to be locked to the section 14 it is placed in the position shown in Fig. 2 and the U-shaped latching device is forced over the lug 21, whereupon the screw 23 is forced in place and this serves to draw the two halves of the barrel and hopper together. A tight joint is thus formed at the bottom of the hopper and leakage of the juices of the food is prevented. I do not claim to be the first to provide a split hopper and barrel in a food chopper as I am aware such construction is old nor do I claim means for fastening split hoppers and barrels together, but I believe that I am the first to provide a locking and latching device at the bottom arranged to securely fasten the barrel together at such point, and I believe that I am the first to pivot complementary parts of the hopper together at the top in such manner that when the latching and locking device at the bottom is released the forcer together with the cutters, if desired, may be entirely removed from the barrel through the bottom.

The arrangement of the hinge 16 at the top and the clamping element 19 at the bottom of the barrel is very advantageous as it permits the device to be readily cleaned. When the clamping element is removed from the section 15, this section can be swung into position shown in Fig. 3 of the drawings and the entire device held under a faucet allowing water to pass through the hopper and barrel thereby cleaning the parts in an easy and efficient manner.

What I claim is:—

1. A food chopper comprising a barrel and hopper vertically divided to form two complementary sections, a worm arranged within the barrel, means for revolving the worm, a hinge secured to the two sections above the worm and clamping means carried by one section under the worm and adapted to clamp the other section thereto.

2. A food chopper comprising a barrel and hopper vertically divided to form two complementary sections, a standard secured to the bottom of one of said sections, clamping means carried by the standard, a worm arranged within the barrel, means for rotating the worm, a hinge secured to the sections at the top, and adjustable clamping means carried by one of said sections under the worm and adapted to secure the other section in position.

In testimony whereof, I affix my signature in the presence of witnesses.

CLARENCE SCHOCK.

Witnesses:
 ANNA DEARBECK,
 CHRIST WALTERS.

Copies of this patent may be obtained for five cents each, by addressing the "Commissioner of Patents, Washington, D. C."